United States Patent [19]
Peschka et al.

[11] Patent Number: 5,463,868
[45] Date of Patent: Nov. 7, 1995

[54] HEAT PUMPING METHOD AS WELL AS HEAT PUMP FOR GENERATING CRYOGENIC TEMPERATURES

[75] Inventors: Walter Peschka, Sindelfingen; Gottfried Schneider, Stuttgart, both of Germany

[73] Assignee: Deutsche Forschungsanstalt fuer Luft- und Raumfahrt e.V, Bonn, Germany

[21] Appl. No.: 166,704

[22] Filed: Dec. 14, 1993

[30] Foreign Application Priority Data

Dec. 17, 1992 [DE] Germany ............... 42 42 642.1

[51] Int. Cl.$^6$ .................................................. F25B 21/00
[52] U.S. Cl. .................................................. 62/6; 62/3.1
[58] Field of Search ................................... 62/3.1, 6

[56] References Cited

U.S. PATENT DOCUMENTS

| | | | |
|---|---|---|---|
| 3,154,927 | 11/1964 | Simon | 62/3.1 |
| 3,413,814 | 12/1968 | Van Geuns | 62/3.1 |
| 3,436,924 | 4/1969 | Lawless | 62/3.1 |
| 3,638,440 | 2/1972 | Lawless | 62/3.1 |
| 3,650,117 | 3/1972 | Robinson et al. | 62/3.1 |
| 4,136,525 | 1/1979 | Van Vechten | 62/3.1 |
| 5,177,970 | 1/1993 | Chang | 62/3.1 |
| 5,182,914 | 2/1993 | Barclay et al. | 62/3.1 |

FOREIGN PATENT DOCUMENTS

| | | | |
|---|---|---|---|
| 3535083 | 4/1987 | Germany | 62/3.1 |
| 1044906 | 9/1983 | U.S.S.R. | 62/3.1 |
| 1467339 | 3/1989 | U.S.S.R. | 62/3.1 |

*Primary Examiner*—Christopher Kilner
*Attorney, Agent, or Firm*—Barry R. Lipsitz

[57] ABSTRACT

In order to provide a heat pumping method, in particular for generating cryogenic temperatures, which is efficient and less susceptible to malfunctions than known methods, the following, cyclically recurring method steps are suggested:

Heating an electrically polarizable medium;

cooling the heated polarizable medium by an operating medium;

heating the operating medium in a regenerator;

transferring part of the heat of the operating medium absorbed from the polarized medium to a warm-side heat exchanger;

adiabatically terminating the action of the electric field on the polarized medium;

cooling the stored operating medium;

further cooling the operating medium cooled by the regenerator;

cooling a cold-side heat exchanger with the operating medium cooled by the polarizable medium.

25 Claims, 1 Drawing Sheet

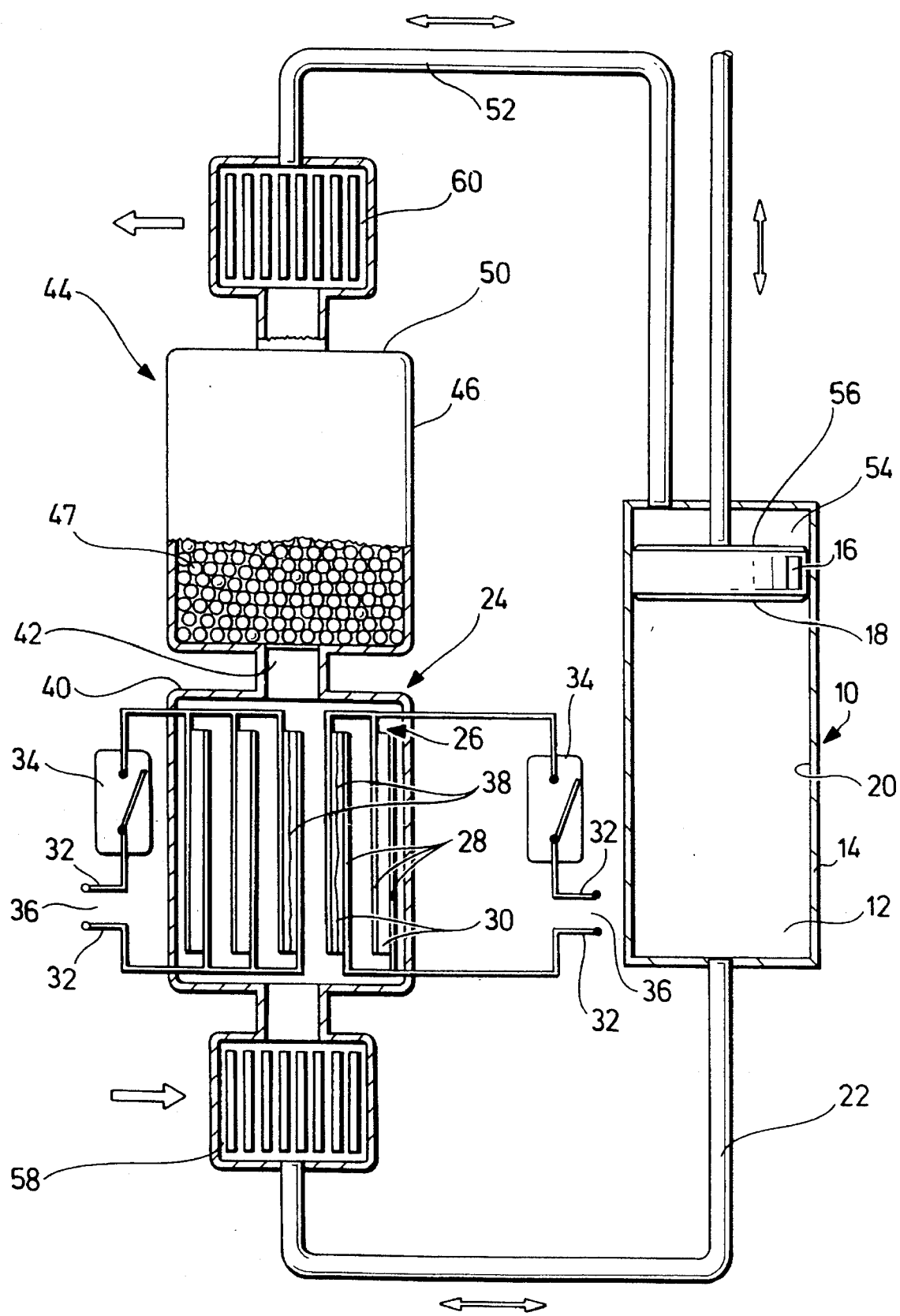

HEAT PUMPING METHOD AS WELL AS HEAT PUMP FOR GENERATING CRYOGENIC TEMPERATURES

The invention relates to a heat pumping method, in particular for generating cryogenic temperatures, as well as a heat pump comprising a first chamber on the cold side and a second chamber on the warm side, a regenerator arranged therebetween as well as a device for cyclic displacement of an operating medium from one chamber to the other.

Extremely reliable and economically feasible heat pumping methods for generating cryogenic temperatures, in particular, in the range below 150° Kelvin are required for a number of applications, e.g. for space travel; these methods can be carried out by means of heat pumps which are characterized by a long useful life.

When such methods are being developed, the aim is to manage with as few parts as possible which are mechanically moved and therefore subject to wear and tear. An additional aim is to keep the speed, with which these parts move, as low as possible which does, however, mean a reduction in the refrigeration capacity which can be achieved with such methods. For this reason, these methods are preferably used in the field of low refrigeration capacities amounting to a few Watts.

In one known heat pumping method, which has been developed for space travel and operates according to an inverse Stirling process, an operating medium is compressed isothermally at room temperature, moved to a place to be cooled, thereby cooled in accordance with a temperature gradient already existing, expanded at the place to be cooled and, subsequently, heated up again according to the temperature gradient and returned. This requires considerable resources with respect to apparatus due to a large number of parts which are moved relative to one another, namely at least one compression device operating at room temperature, a displacer device and an expansion device operating at a low temperature. On the other hand, a heat pumping method developed by Gifford and McMahon requires, apart from a displacer device for the operating gas, only a compression device operating at room temperature as well as an inlet valve and an outlet or expansion valve likewise provided at room temperature. Therefore, no device components which are moved at low temperatures under high loads are required for performing this heat pumping method, which closely follows a Stirling process to be carried out in the reverse direction and which is described in detail in the book of G. G. Haselden, Cryogenic Fundamentals, pg. 752, Academic Press, London, 1971. Nevertheless, this method is still very susceptible to interruptions or malfunctions due to the necessity of the compression device and the system necessary for carrying out the method requires very intensive maintenance.

For carrying out a further, known method, which makes use of the so-called magnetic refrigeration, it is not necessary to use compressors which require maintenance and are susceptible to malfunctions but rather the refrigeration is carried out by cyclically adiabatic demagnetization of paramagnetic materials or ferromagnetic materials which are in the temperature range of their Curie points or above. The disadvantage of this method is, however, the fact that the cyclic magnetization and demagnetization cannot be carried out quickly enough for various reasons, in particular due to the high magnetic field intensities required, which can be generated almost only by means of superconductive coils. A cycle frequency of approximately 1 Hz would seem to represent the upper limit in this case, which means that the efficiency of this heat pumping method is very limited.

The object underlying the invention is therefore to provide a heat pumping method, in particular for generating cryogenic temperatures, which is efficient and less susceptible to malfunctions than known methods, which can be carried out with resources relating to the required apparatus which entail low costs and which is, nevertheless, economically feasible.

This object is accomplished in accordance with the invention, in a method described at the outset, by the following cyclically recurring method steps:

Heating an electrically polarizable medium by applying an electric field generated by a high voltage to the electrically polarizable medium;

cooling the heated polarized medium by an operating medium kept ready beforehand in a first chamber, the operating medium thereby being heated;

heating the operating medium according to a temperature gradient within a regenerator;

transferring at least part of the heat of the operating medium absorbed beforehand from the polarized medium to a warm-side heat exchanger and storing the operating medium in a second chamber;

adiabatically terminating the action of the electric field on the polarized medium, whereby the polarized medium is cooled to a temperature below its temperature prior to application of the field;

cooling the stored operating medium from the second chamber in accordance with the temperature gradient within the regenerator, whereby the heat absorbed beforehand from the regenerator is returned thereto at least for the most part;

further cooling the operating medium cooled by the regenerator to a temperature below its initial temperature by the cooled polarizable medium;

cooling a cold-side heat exchanger with the operating medium cooled by the polarizable medium and storing the operating medium in the first chamber.

The electrically polarizable medium can be a dielectric or a ferroelectric material, the thermodynamic degree of order of which increases due to the influence of an electric field, whereby heat is generated which causes an increase in the temperature of the medium. At least part of this heat is transferred to the operating medium, preferably helium, hydrogen or argon although other media are also conceivable, and this medium, for its part, transfers at least part of this heat to the heat exchanger arranged on the warm side of the regenerator after it has been heated up in the regenerator from low temperatures to ambient temperature.

The regenerator is a heat storage means which, in the ideal case, is not thermally conductive in the direction of flow and by means of which the operating medium is heated from low temperatures to ambient temperature and, when the operating medium flows through the regenerator in the reverse direction, cooled again to low temperatures. The use of a regenerator for heating up and cooling down an operating medium in thermal motors or heat pumps is known, for example, from the PHILIPS gas refrigerating machine, in which an inverse Stirling process, as specified at the outset, is followed. The regenerator which has operating medium flowing through it has, for example, in its interior small metal balls as well as metal chips. With these, the head conductivity is, on the one hand, kept very small in the direction of flow due to the merely punctual contact between the small metal balls and, on the other hand, the considerable heat capacity of the metal represents a heat or cold storage capacity. When the operating medium flows through the regenerator in cycles, a temperature gradient will result in the interior of the regenerator between the ambient temperature of the heat pump and the temperature level of the polarizable medium which is cooled further during the course of the process.

If the action of the electric field on the polarized medium is terminated adiabatically—in the simplest case, a capacitor which is connected to a high voltage and contains the polarizable medium between its electrodes is disconnected from the high voltage for this purpose or the polarized medium is moved to a place having a low or diminishing electric field intensity—the polarized medium is cooled due to the dependence of its thermodynamic state function on both the temperature and the electric field intensity and the resulting cooling capacity is transferred to the operating medium, with which a cold-side heat exchanger is then cooled.

The operating medium which flows back and forth between the first and second chambers in cycles is preferably displaced out of the first and the second chamber, respectively. This can be carried out, in particular, by a simple displacer assembly with a displacer piston. The differences in pressure which have to be built up by the displacer assembly for overcoming the flow resistance during the flow of gas are negligibly small so that practically no wear and tear influencing the useful life of the displacer assembly will occur.

At the commencement of the inventive heat pumping method, the operating medium, the polarizable medium as well as the regenerator have, for example, the same initial temperature. The polarizable medium is then heated by the action of an electric field generated by a high voltage. The operating medium which is brought into thermal contact with the polarized medium absorbs heat and releases this in the regenerator which is still at the initial temperature and in the warm-side heat exchanger. Due to adiabatic termination of the action of the electric field on the polarized medium, this is cooled to a temperature below the initial temperature and the corresponding cooling capacity is transferred at least partially to the cold-side heat exchanger by means of the operating medium now flowing in the opposite direction. Following a larger number of cycles, a distribution of temperature results in this manner, in which the polarizable medium as well as the cold-side heat exchanger are at a low temperature while a distribution of temperature results in the regenerator which increases to ambient temperature along its flowable length.

The operating medium is therefore supplied at a low temperature, at the cold-side heat exchanger and in each cycle with an amount of heat, which is withdrawn again, at least partially, from the operating medium at the warm-side heat exchanger.

If a ferroelectric material is used as polarizable medium, it proves to be advantageous in the stationary cooling operation, with respect to the cooling capacity achievable with the method, for the temperature of the ferroelectric material to be kept in the range of its Curie point.

The electric field generated by a high voltage can be applied to the polarizable medium or act on the polarizable medium in any optional manner. As already mentioned in the above, the polarizable medium can be brought in a cycle to a place having considerable electric field intensity or to a place having diminishing or low electric field intensity. The electric field can, however, also be built up or reduced by means of electrodes, which are applied to the polarizable medium and are cyclically connected to a high voltage. Preferably, the electric field is, however, applied by a capacitor arrangement which contains the electrically polarizable medium and to which a high voltage in the range of between approximately 80 and approximately 98% of the breakdown voltage of the capacitor arrangement containing the polarizable medium is cyclically applied.

In order to generate a thermal contact between the operating medium and the polarizable medium, it is advantageous in the above case for the former to be conveyed past the electrodes of the capacitor; for this purpose, the thermal transfer resistance between the polarizable medium, which is heated and cooled, and the capacitor plates should, however, be as low as possible. In addition, it is conceivable and also advantageous with a view to a good thermal coupling for the operating medium to be conveyed through openings in the polarizable medium.

With a view to determining the method parameters it is suggested that the cycle frequency be selected as a function of the flow losses during the displacement of the operating medium and as a function of the heat transfer between the polarizable medium and the operating medium or between the operating medium and the heat exchangers. The increase in the cooling capacity, which, as such, results from an increase in the cycle frequency, is limited by the heat transfer becoming more incomplete with an increasing frequency. The flow losses which increase with an increasing frequency lead to an increase in power requirements for performing the method and the forces thereby occurring can result in signs of wear and tear. Cycle frequencies in the range of approximately 5 to approximately 25 Hz are preferably selected as a function of the respective circumstances. It is particularly advantageous to select cycle frequencies in the range of 10–20 Hz, or even better in the range of 15–20 Hz.

The additional object underlying the invention was to provide a heat pump of the type mentioned at the outset, in which the movable parts subject to wear and tear are as few as possible, which does not, in particular, need a compressor which is subject to maintenance and susceptible to breakdowns and which enables a cycle frequency to be achieved which is as high as possible.

This object is accomplished in accordance with the invention, in a heat pump comprising a first chamber on the cold side and a second chamber on the warm side, a regenerator arranged therebetween as well as a device for the cyclic displacement of an operating medium from one chamber to the other, in that an attemperating device is provided between the first chamber and the regenerator, this device containing an electrically polarizable medium and having the operating medium flowing through it, that the electrically polarizable medium is adapted to be heated by applying an electric field by way of the attemperating device and cooled by adiabatic termination of the action of the electric field, that a warm-side heat exchanger is arranged from the point of view of flow technology on the warm side of the regenerator for cooling the operating medium heated by the regenerator and a cold-side heat exchanger is arranged on the side of the attemperating device remote from the regenerator from the point of view of flow technology for transferring heat to the operating medium.

The heat pump is advantageously designed such that the device for the cyclic displacement of the operating medium comprises a displacer assembly with a movable displacer piston. The differences in pressure necessary for the displacement of the operating medium by means of a displacer assembly are very small so that signs of wear and tear caused by the forces acting on the piston and on the seals, as occur in compressors, can be ruled out.

In addition, it has proven advantageous from a constructional point of view, in a heat pump designed as described above, for the first and the second chambers to be formed by the displacer assembly and limited by the one side or the other of a thermally insulating displacer piston. For the specific operation of the heat pump the second chamber could, however, also be formed by the surroundings of the heat pump.

For the purpose of applying an electric field to the electrically polarizable medium this could be provided with electrodes which can be cyclically connected to a high voltage within the attemperating device. In a preferred embodiment of the inventive heat pump, for applying the electric field the attemperating device comprises a capacitor having the polarizable medium arranged between its electrodes. This can be a plate capacitor which preferably comprises a plurality of capacitor plates connected, in particular, in parallel or a capacitor having electrodes arranged essentially coaxially.

In order to generate a thermal contact between the operating medium and the electrically polarizable medium which can be heated up or cooled down, the attemperating device of the heat pump is advantageously designed such that the operating medium flows around the electrodes of the capacitor. It is, however, also conceivable and advantageous for openings to be provided in the polarizable medium for the operating medium to flow through.

The latter embodiment proves to be particularly advantageous when the polarizable material is not permanently arranged between the electrodes of the capacitor but cyclically inserted into and removed from an electric field existing between the plates of the capacitor in the manner of a rotatable capacitor.

A particularly simple construction, which is, therefore, susceptible to few breakdowns, is one, in which the warm-side heat exchanger has a coolant flowing through it during operation of the heat pump and the cold-side heat exchanger is connected with a reservoir to be cooled in a thermally conductive manner.

In accordance with an additional embodiment of the inventive heat pump, several different ferroelectric materials having differing Curie temperatures are provided as polarizable medium in order to cover as large a temperature range as possible, within which the heat pump can be operated at an optimum cooling capacity.

The attemperating device can also be of a multiple-stage design, whereby for different ranges of temperature different capacitors with differing polarizable media are provided.

Additional features, advantages and details of the invention result from the following description as well as the schematic drawing of one embodiment of the inventive heat pump as well as its mode of operation.

The sole FIGURE is a schematic drawing of a heat pump employing one embodiment of the invention.

The inventive heat pump schematically illustrated in the FIG. 1 comprises a displacer assembly 10 with a displacer cylinder 14 enclosing a displacer volume 12 and a displacer piston 16. The displacer cylinder 14 forms a first chamber 20 together with a piston surface 18 of the displacer piston 16. A first line 22 leads from this first chamber 20 to an attemperating device 24 with a housing and an assembly provided therein which consists of several plate capacitors 26 connected in parallel. A polarizable medium 30, e.g. a ferroelectric medium, is arranged between plate-like electrodes 28 of the plate capacitors 26. The plate capacitors 26 can be cyclically connected to a high voltage source 36, which is merely indicated in the drawing, via lines 32 as well as via a control 34. The control 34 interacts with a piston drive unit which moves the displacer piston 16 up and down but is not illustrated in the drawing such that the plate capacitors 26 are connected to the high voltage source 36 shortly before the displacer piston 16 moves downwards according to the drawing from its upper dead center and that they are disconnected again from the high voltage source 36 shortly before the displacer piston 16 is moved upwards according to the drawing from its bottom dead center.

Optionally, the attemperating device can be of a multiple-stage design having different polarizable media for different ranges of temperature. Multiple staging is illustrated in the FIGURE. A first stage in a left part of the attemperating device 24 has, for example, three plate capacitors 26 cyclically connected via lines 32 to a control 34 and a voltage source 36. In a right part of the attemperating device 24, a second stage has, for example, two plate capacitors 26 cyclically connected via lines 32 to another control 34 and a voltage source 36. Between the left-part capacitors is a ferroelectric material with a Curie temperature higher than the Curie temperature of a different ferroelectric material between the right-part capacitors. In operation, when the temperature of the attemperating device is within a high temperature range ranging from room temperature down to a preselected switching temperature, voltage is cyclically applied to the left-part capacitors only. When the temperature of the attemperating device is below the preselected switching temperature, voltage is cyclically applied to the right-part capacitors only.

The attemperating device 24 is designed such that an, in particular, gaseous operating medium, such as, e.g., helium or hydrogen, can flow through it so that a thermal contact can be established between the operating medium and the polarizable medium 30 as well as the plate-like electrodes 28. The polarizable medium 30 also has, for this purpose, channel-like openings 38 which extend through the polarizable medium 30 in such a way that the operating medium can flow through them.

A side 40 of the attemperating device 24 remote from the opening of the first line 22 is connected to a regenerator 44 by way of a short line section 42. The regenerator 44 is a heat storage means which, in the ideal case, is thermally non-conductive in the direction of flow. It essentially consists of a housing 46, through which the operating medium can flow and which is filled with small metal balls 47, the diameter of which is in the millimeter range. A side 50 of the regenerator 44 which is remote from the attemperating device 24 from the point of view of flow technology is connected to a second chamber 54 via a second line 52. This second chamber 54 is formed by the displacer cylinder 14 as well as a second piston surface 56 located opposite the first piston surface 18. Both chambers 20 and 54 are therefore formed by the same displacer cylinder 14 and are limited by the first or second piston surface 18 and 56, respectively, of the displacer piston 16.

Finally, a cold-side heat exchanger 58 is provided in the first line 22 and a warm-side heat exchanger 60 in the second line 52. Heat from a reservoir to be cooled is supplied to the operating medium flowing through the first line 22 via the cold-side heat exchanger 58, and the operating medium coming from the regenerator 44 and flowing in the direction of the second chamber 54 is cooled via the warm-side heat exchanger 60.

At the beginning of the cooling operation, all the components of the inventive heat pump are at room temperature and the displacer piston 16 is in its upper dead center, i.e. the volume of the second chamber 54 is negligibly small and the volume of the first chamber 20 has reached its maximum size and comprises a major proportion of the operating medium. At the beginning of the cooling cycle the plate capacitors 26 are connected via the control 34 to the high voltage source 36 so that the polarizable medium 30 is pervaded by an electric field, the field intensity of which is close to the dielectric strength of the breakdown of the capacitors 26 filled with the polarizable medium 30, and is heated thereby. Due to downward movement of the displacer piston 16, the operating medium is displaced out of the first chamber 20 and flows through the cold-side heat exchanger 58 which is, to begin with, at room temperature and, subsequently, through the attemperating device 24, in which the operating medium comes into thermal contact with the heated polarizable medium 30 and cools it, whereby it is, itself, heated up. After leaving the attemperating device 24 via the short line section 42, the operating medium flows through the regenerator 44 and, subsequently, through the warm-side heat exchanger 60 and passes into the second chamber 54 via the second line 52. In this respect, it transfers at least part of the heat absorbed beforehand from the polarizable medium 30 to the regenerator 44 which is still at room temperature and to the warm-side heat exchanger 60. If the plate capacitors 26 are disconnected from the voltage source 36 by the control 34 and the action of the electric field therefore terminated adiabatically, the polarizable medium 30 is cooled, due to the dependence of its thermodynamic state function on the temperature and the electric field intensity, to a temperature below its initial temperature and, during the following upward movement of the displacer piston 16, cools the operating medium which is now flowing in the opposite direction through the second line 52, the warm-side heat exchanger 60, the regenerator 44 and the attemperating device 24 to a temperature below its initial temperature in the first chamber 20. The cooled operating medium flows through the first line 22 in the direction of the first chamber 20 and thereby cools a reservoir to be cooled via the cold-side heat exchanger 58.

In this way, the attemperating device 24 with the plate capacitors 26 and the polarizable medium 30 as well as the cold-side heat exchanger 58, or rather the reservoir to be cooled, are cooled to low temperatures following a larger number of cycles whereas a temperature distribution rising from a low temperature to ambient temperature results in the regenerator 44, namely in the direction from the end facing the attemperating device 24 towards the end facing the warm-side heat exchanger 60.

During the stationary cooling operation, i.e. when the state described above has been reached, the operating medium flowing from the first chamber 20 in the direction of the second chamber 54 is heated in the regenerator 44 from a low temperature to ambient temperature and, when the operating medium flows in the opposite direction, it is cooled to a low temperature.

What is claimed is:

1. A heat pumping method comprising the following, cyclically recurring steps:

(a) heating an electrically polarizable medium by applying thereto an electric field generated by a high voltage;

(b) cooling the heated, polarized medium by an operating medium received from a first chamber, the operating medium thereby being heated;

(c) heating the operating medium according to a temperature gradient within a regenerator element through which the operating medium flows;

(d) transferring at least part of the heat of the operating medium previously absorbed from the polarized medium to a warm-side heat exchanger and storing the operating medium in a second chamber;

(e) adiabatically terminating the action of the electric field on the polarized medium, whereby the polarized medium is cooled to a temperature below its temperature prior to application of the field;

(f) cooling the stored operating medium from the second chamber in accordance with the temperature gradient within the regenerator, whereby the heat previously absorbed from the regenerator is substantially returned thereto;

(g) further cooling the operating medium cooled by the regenerator to a temperature below its initial temperature by the cooled polarizable medium; and (h) cooling a cold-side heat exchanger by the operating medium cooled by the polarizable medium and storing the operating medium in the first chamber.

2. A method as in claim 1 wherein the operating medium is displaced out of the first and second chambers.

3. A method as in claim 1 wherein helium is used as the operating medium.

4. A method as in claim 1 wherein hydrogen is used as the operating medium.

5. A method as in claim 1 wherein a ferroelectric material is used as the polarizable medium and the temperature of the ferroelectric material is kept in the range of its Curie point during the stationary cooling operation.

6. A method as in claim 1 wherein the electric field is applied by a capacitor arrangement containing the electrically polarized medium.

7. A method as in claim 6 wherein the operating medium is conveyed past the electrodes of the capacitor to generate a thermal contact between the operating medium and the polarizable medium.

8. A method as in claim 1 wherein the operating medium is conveyed through openings in the polarizable medium to generate a thermal contact between the operating medium and the polarizable medium.

9. A method as in claim 1 wherein the cycle frequency of said cyclically recurring steps is selected as a function of the flow losses during the displacement of the operating medium and as a function of the heat transfer between the polarizable medium and the operating medium.

10. A method as in claim 9 wherein cycle frequencies in the range of approximately 5 Hz to approximately 25 Hz are selected.

11. A method as in claim 9 wherein cycle frequencies in the range of approximately 10 Hz to 20 Hz are selected.

12. A method as in claim 1 wherein the cycle frequency of said cyclically recurring steps is selected as a function of the flow losses during the displacement of the operating medium and as a function of the heat transfer between the operating medium and the heat exchangers.

13. A method as in claim 12 wherein cycle frequencies in the range of approximately 5 Hz to approximately 25 Hz are selected.

14. A method as in claim 12 wherein cycle frequencies in the range of approximately 10 Hz to 20 Hz are selected.

15. A heat pumping method comprising the following, cyclically recurring steps:

(a) heating an electrically polarizable medium by applying thereto an electric field generated by a capacitor arrangement containing said medium and receiving a high voltage in a range of from approximately 80% to approximately 98% of the breakdown voltage of the capacitor arrangement;

(b) cooling the heated, polarized medium by an operating medium received from a first chamber, the operating medium thereby being heated;

(c) heating the operating medium according to a temperature gradient within a regenerator;

(d) transferring at least part of the heat of the operating medium previously absorbed from the polarized medium to a warm-side heat exchanger and storing the operating medium in a second chamber;

(e) adiabatically terminating the action of the electric field on the polarized medium, whereby the polarized medium is cooled to a temperature below its temperature prior to application of the field;

(f) cooling the stored operating medium from the second chamber in accordance with the temperature gradient within the regenerator, whereby the heat previously absorbed from the regenerator is substantially returned thereto;

(g) further cooling the operating medium cooled by the regenerator to a temperature below its initial temperature by the cooled polarizable medium; and (h) cooling a cold-side heat exchanger by the operating medium cooled by the polarizable medium and storing the operating medium in the first chamber.

16. A heat pump comprising:

(a) an electrically polarizable medium;

(b) an attemperating device containing said polarizable medium and permeable to an operating medium, said device capable of applying an electric field to said polarizable medium thereby polarizing and heating said polarizable medium, and capable of adiabatically removing an electric field from said polarizable medium thereby depolarizing and cooling said polarizable medium, said device having a first side and a second side remote from said first side;

(c) a cold-side heat exchanger connected for flow with said first side of said attemperating device, said cold-side heat exchanger for transferring heat to said operating medium;

(d) a regenerator element through which said operating medium flows and having a warm side and a cold side, said regenerator cold side connected for flow with said second side of said attemperating device;

(e) a warm-side heat exchanger connected for flow with said regenerator warm side, said warm-side heat exchanger for transferring heat from an operating medium;

(f) a first chamber connected for flow with said cold-side heat exchanger;

(g) a second chamber connected for flow with said warm-side heat exchanger; and (h) a device for cyclic displacement of said operating medium between said first chamber and said second chamber.

17. A heat pump as in claim 16 wherein said device for cyclic displacement of the operating medium comprises a displacer assembly with a movable displacer piston.

18. A heat pump as in claim 17 wherein said first and second chambers are formed by said displacer assembly and are limited by a first side of a thermally insulated displacer piston and a second side of said piston opposite to said first side.

19. A heat pump as in claim 16 wherein said attemperating device comprises a capacitor having electrodes with said polarizable medium arranged therebetween.

20. A heat pump as in claim 19 wherein said capacitor electrodes are disposed to permit the flow of operating medium around said electrodes.

21. A heat pump as in claim 19 wherein said polarizable medium has openings for throughflow of operating medium.

22. A heat pump as in claim 16 wherein said warm-side heat exchanger is adapted for throughflow of a coolant.

23. A heat pump as in claim 16 wherein said cold-side heat exchanger is connected in a thermally conductive manner with a reservoir to be cooled.

24. A heat pump as in claim 16 wherein said polarizable medium comprises different ferroelectric materials respectively having different Curie temperatures.

25. A heat pump as in claim 16 wherein said attemperating device is of a multiple-stage design.

* * * * *